United States Patent [19]

Matteucci

[11] Patent Number: 5,361,748
[45] Date of Patent: Nov. 8, 1994

[54] METHOD AND DEVICE FOR CUTTING UNDERWATER STRUCTURES

[76] Inventor: Francesco Matteucci, 10/4 Via M. Staglieno, Genova, Italy

[21] Appl. No.: 213,817

[22] Filed: Mar. 16, 1994

Related U.S. Application Data

[63] Continuation of Ser. No. 930,348, Aug. 17, 1992, abandoned.

[30] Foreign Application Priority Data

Nov. 6, 1991 [IT] Italy .......................... GE91A000143

[51] Int. Cl.⁵ .......................................... B28D 1/08
[52] U.S. Cl. .................................... 125/21; 451/460; 83/661
[58] Field of Search ............... 125/12, 21, 38, 30.02; 51/241 S; 83/661; 405/156, 171, 195.1

[56] References Cited

U.S. PATENT DOCUMENTS

| H45 | 4/1986 | Gilmore | 51/241 S |
|---|---|---|---|
| 1,689,829 | 10/1928 | Heintz | 51/148 |
| 2,150,381 | 3/1939 | Lansing | 125/21 |
| 2,674,238 | 4/1954 | Dessureau et al. | 125/21 |
| 2,795,222 | 6/1957 | Garrison | 125/21 |
| 3,056,267 | 10/1962 | McCree . | |
| 3,479,830 | 11/1969 | Ostarly . | |
| 3,578,233 | 5/1971 | Meister et al. | 405/156 |
| 4,109,480 | 8/1978 | Sumner | 405/171 |
| 4,765,307 | 8/1988 | Kubo | 125/12 |
| 4,777,723 | 10/1988 | Southoff | 51/241 S |
| 4,787,363 | 11/1988 | Kubo | 125/21 |
| 4,936,284 | 6/1990 | Johnson | 125/21 |
| 5,010,694 | 4/1991 | Agbede | 51/241 S |

FOREIGN PATENT DOCUMENTS

| 2059273 | 2/1990 | Japan | 125/21 |
|---|---|---|---|
| 150377 | 9/1962 | U.S.S.R. | 51/241 S |
| 659687 | 4/1979 | U.S.S.R. | 405/195.1 |
| 777146 | 11/1980 | U.S.S.R. | 405/195.1 |

Primary Examiner—Jack W. Lavinder
Attorney, Agent, or Firm—Larson and Taylor

[57] ABSTRACT

A method of cutting underwater structures which comprises the following steps:
a local underwater step including:
  the anchorage of cutting means in the cutting area, exactly positioned to effect the desired cut, to the structure to be cut;
a remotely-controlled step including:
  the automatic activation and de-activation, from a spot at the surface, of the cutting means and the automatic feed thereof in the cutting direction from a non-interference position through the structure, the cutting means being provided with cutting tools for cutting metallic and non-metallic materials;
a local underwater step for recovering the cutting means (T).

14 Claims, 4 Drawing Sheets

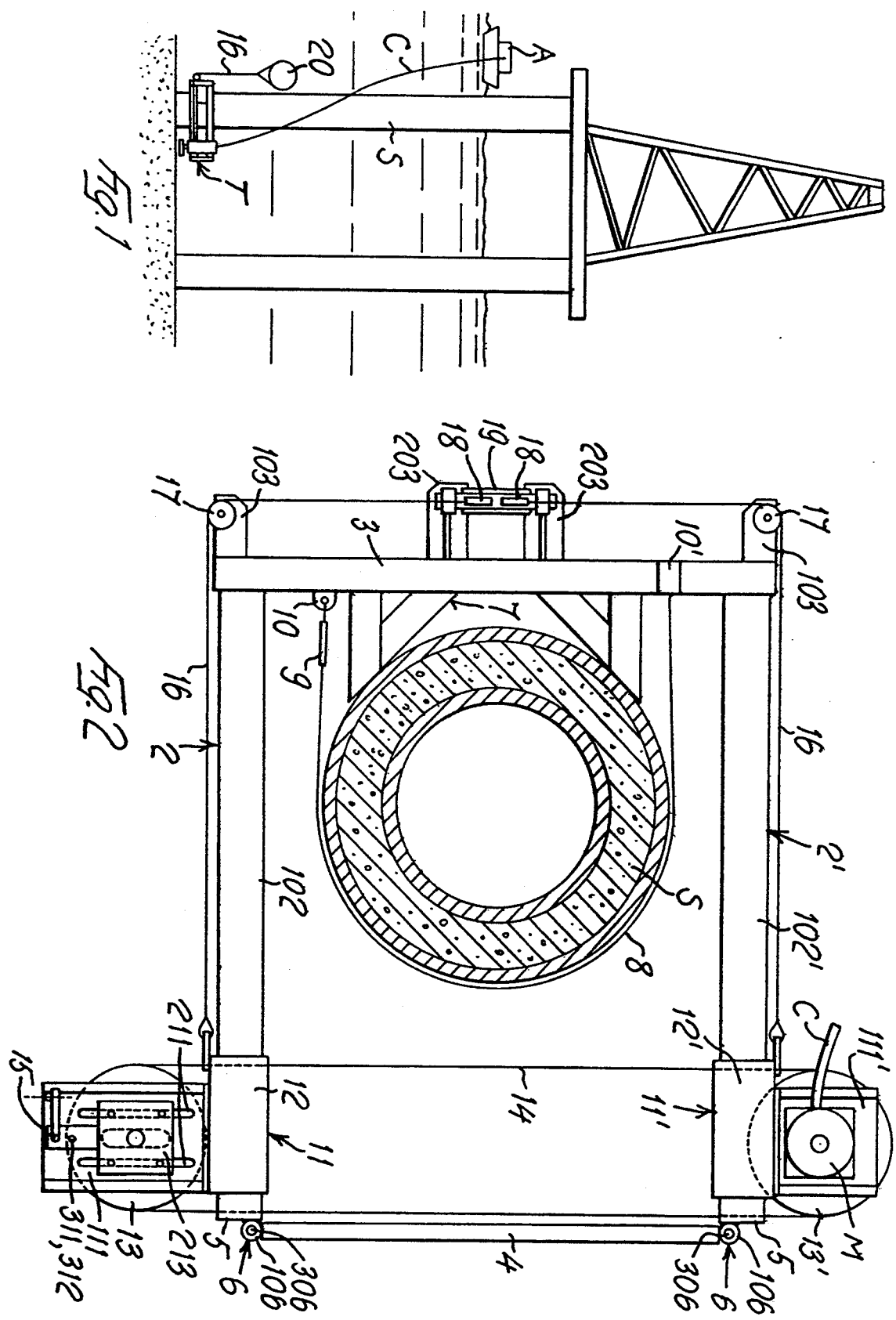

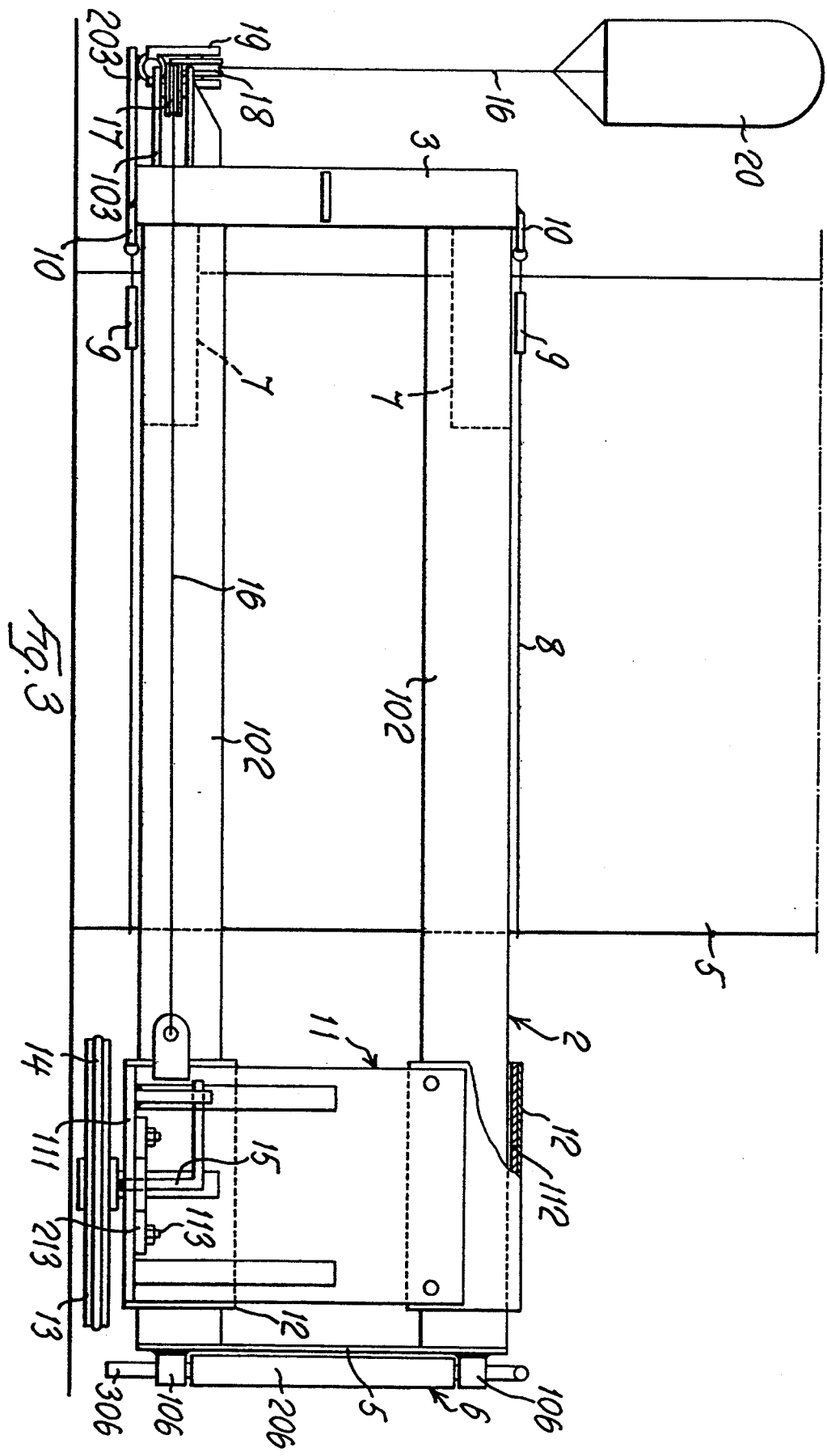

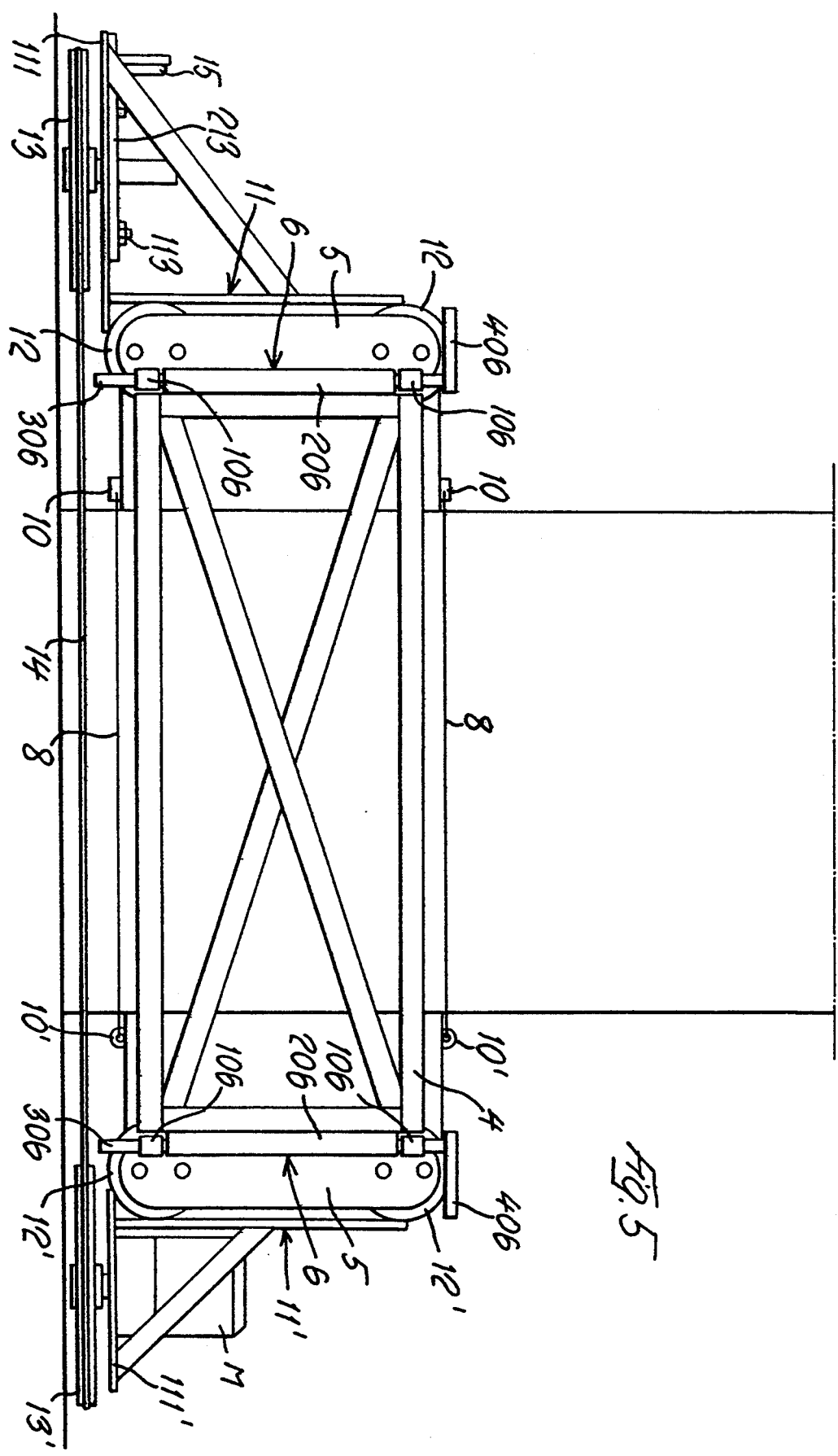

METHOD AND DEVICE FOR CUTTING UNDERWATER STRUCTURES

This application is a continuation of application Ser. No. 07/930,348 filed Aug. 17, 1992, now abandoned.

BACKGROUND OF THE INVENTION

The invention relates to a method and a device for cutting underwater structures and particularly for cutting underwater structures such as, for example, ducts, pillars supporting offshore platforms, or the like and which are made mostly of steel or other metals or of mixed materials, such as steel or other metals and cement, or the like.

At present, said structures are cut manually by teams of underwater workmen who operate directly on the spot with suitable tools such as, for example, thermal lances, electrodes for underwater cutting, grinders, pipe-cutters, etc. However, these operations are tiresome, expensive and involve considerable fatigue and risks for the operating personnel. The high costs of these operations are determined by the considerable duration of the cutting operations, by the necessity to engage highly-specialized operating personnel in very dangerous conditions, and by the resulting necessity to provide adequate assistance means with a corresponding number of auxiliary operators. The operating conditions become even more difficult when the structures to be cut are of the composite type such as, for example, in case of elements constituted by concentric steel pipes whose interspaces are filled with concrete or cement. In effect, in these instances, the cutting through the interspace cannot be ensured even by the most sophisticated tools, so that the intermediate layer of cement must be broken down before acting on the inner pipes. The duration of these operations may last even several days.

Therefore, the invention is based on the problem of providing a method and a device for cutting underwater structures, which, thanks to a construction as simple and economical as possible, permit to carry out the cutting operations with extreme ease and rapidity, minimizing the risks and costs.

SUMMARY OF THE INVENTION

The invention solves said problem by a method of cutting underwater structures, contemplating the following steps:

the anchorage to the structure, in the cutting area thereof, of cutting means which are so positioned as to avoid interferring initially with said structure and which are orientated with their direction of cutting in register with the desired plane of cutting;

the automatic actuation of the cutting means and automatic feed along the plane of cutting, from the non-interference position towards and through the structure;

the execution of the cut in a cold condition and with means capable of cutting metallic and non-metallic materials such as, for example, cement, concrete, rocks, or the like;

the automatic stoppage of the feed and actuation of the cutting means, and the recovey of them.

According to a preferred improvement of said method, the feed of the cutting means is effected by the upward push of water on a body of lower specific gravity, while the push for feeding the cutting means against the structure is adjusted to the optimum value by varying the upward push, i.e. the specific gravity of said body.

In order to work out said method, the invention provides a device for cutting underwater structures, comprising:

an underwater supporting frame with releasable means for anchorage to the structure to be cut and for positioning in registry with the desired plane of cutting;

slide guides secured to the underwater supporting structure and orientated in the direction of cutting and parallelly to the direction of cutting;

a powered underwater cutting unit provided with tools for cold-cutting, which is mounted so as to be displaceable on the slide guides towards said structure, moving the cutting tools from an initial position of non-interference with the structure to a final position wherein said cutting tools have been translated to the opposite side of the structure, passing therethrough along the pre-established cutting plane;

an underwater adjustable unit for displacing said cutting unit in the cutting direction along the slide guides, which is supported by the underwater structure;

remote actuation and/or control means for the cutting unit and, if desired, for the displacing unit, arranged at the surface.

According to a preferred embodiment, the cutting tools are formed by a thread of diamond-coated beads, or the like, of the type capable of cutting metallic materials and cement, stone, rock materials or the like, which is of endless configuration and is taut between two turn-round pulleys, at least one of which is powered, the slide guides being arranged at two diametrically opposite sides of the structure to be cut and the cutting unit being formed by two separate slides associated, respectively, to one of the two slide guides and which carry the turn-round pulleys, while the displacing unit is of the type capable of causing a common advance of the two slides.

In addition to the merely constructional advantages, the method and device according to the invention permit to achieve undoubted functional advantages. The use of specialized underwater personnel is only required, if desired, in the anchorage, recovery and check steps in the course of the work. These steps require a very limited number of underwater operators. The cutting step, however, is controlled directly from the surface. This eliminates completely the disadvantages of the presently-used systems, thus minimizing the risks of the operating personnel and reducing considerably the costs of the operations. Moreover, the cutting operations do not suffer substantially from the meteo-marine conditions and can be carried out uninterruptedly throughout the 24 hours of the day, thus increasing the productivity and reducing the costs furthermore. The cold-cutting means used by the invention permit to obtain much shorter working periods and ensure the utmost safety when working on structures in dangerous environments such as, for example, in the presence of liquid or gaseous hydrocarbons or flammable compounds. The particular construction of the device enables the execution of cutting operations at any depth even exceeding the possibility of use of underwater operators, because the anchorage, recovery and check steps may be easily effected by means of submersible units or by remotely-controlled vehicles.

The invention also relates to other characteristics which further improve said device and which form the subject of the subclaims.

BRIEF DESCRIPTION OF THE DRAWINGS

The particular characteristics of the invention and the advantages resulting therefrom will become more apparent from the description of a preferred embodiment, shown by way of non-limiting example in the accompanying drawings, wherein:

FIG. 1 diagrammatically shows the device according to the invention in the operative position for cutting a pillar supporting an offshore platform;

FIG. 2 is a top plan view of the device of FIG. 1, anchored to the pillar to be cut;

FIGS. 3 to 5 are side elevational views of the device, of the two end sides transverse to the cutting direction and of the side parallel thereto, respectively.

DESCRIPTION OF THE PREFERRED EMBODIMENT OF THE INVENTION

Figure 4:
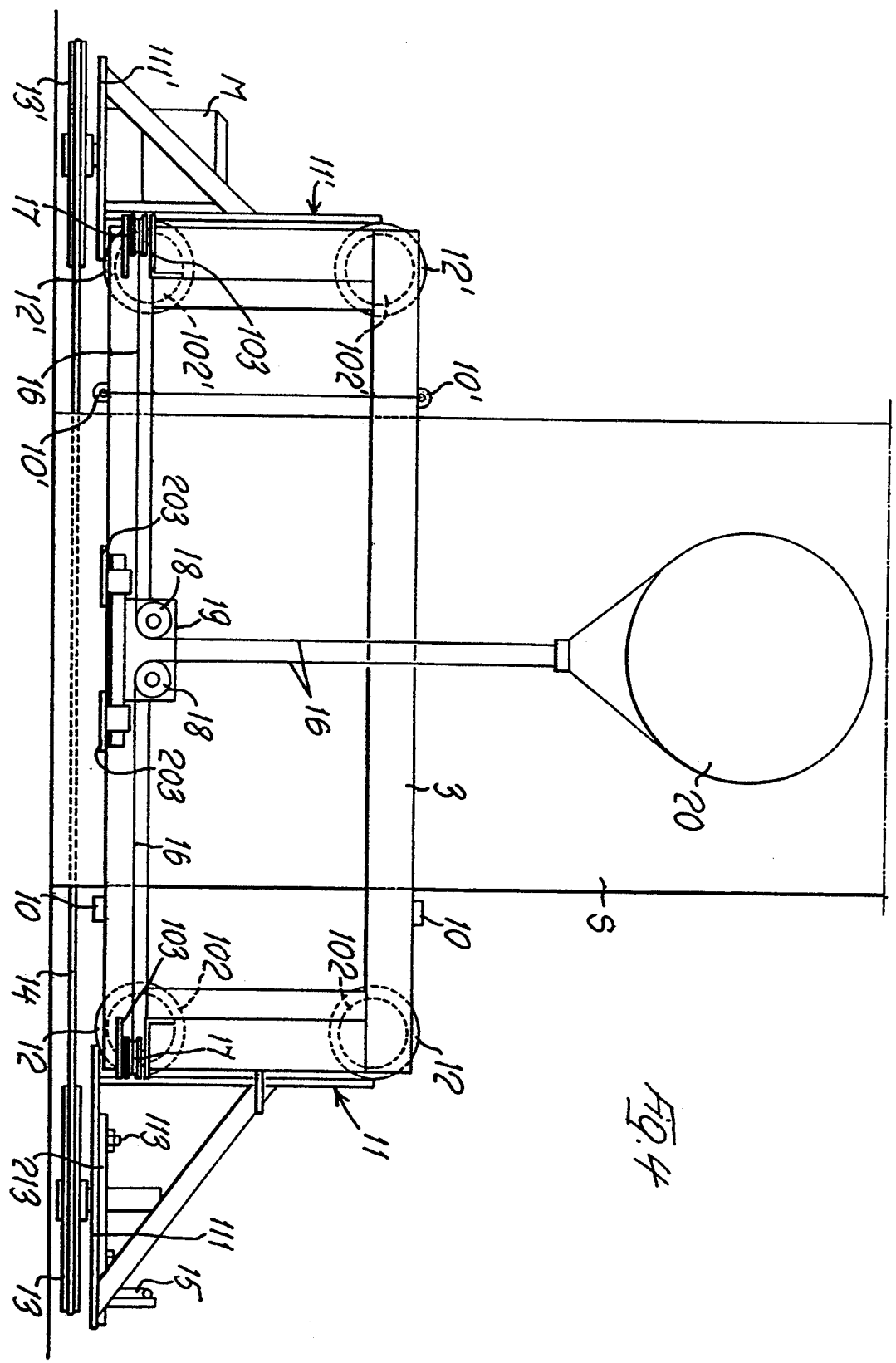

The device shown in the figures is constructed in the form of a cutting frame T of rectangular or square configuration which is anchored directly in straddling relation to the element to be cut S of any structure, for example, around a pillar of an offshore platform. In the illustrated embodiment, the cutting line is displaceable along a cutting plane parallel to one of the longer sides of the cutting frame T. In order to effect a cut through the pillar along a horizontal plane, the cutting frame T, therefore, is arranged flatwise with the cutting line lying on said plane. The actuation and feed of the motors of the cutting frame is effected thanks to control and feed units A arranged at the surface, for example, on suitable auxiliary watercraft and which are connected by umbilical cables C to said cutting frame T. The motors of the cutting frame T may be of any type, namely of electric, hydraulic, pneumatic type, or the like.

The cutting frame T is formed by a quadrilateral framework two opposite sides of which constitute slide guides 2, 2' orientated in the cutting direction, parallelly to each other and to the cutting plane. Each guide 2, 2' comprises two guide tubes 102, 102' which are perfectly aligned to each other perpendicularly to the cutting plane. The free ends of the guides 2, 2' are rigidly connected to each other, at one side by a transverse member 3 connecting the two guides and stationarily secured thereto, and at the opposite side by head members 5. The stationary transverse member 3 and the head members 5 constitute simultaneously the limit stops for the guides 2, 2'. The side of the framework which is opposite to the stationary transverse one 3 is constructed as an openable gate-like member. It comprises a transverse member 4 which is removably secured to the corresponding head members 5 of the guides 2, 2'. As shown particularly in FIG. 5, this is obtained with the aid of hinge-type locking members 6 comprising two bushes 106 which are secured to the head members 5 of the guides in spaced apart relation, and a tube member 206 co-axially arranged therebetween. The hinge spindle is formed by an extractable bolt 306 provided with a radial grasping extension 406 at an end thereof, preferably at the upper end.

The transverse member 3, fixedly secured to the guides 2, 2', is provided intermediately with an anchorage cradle 7 which forms a V-shaped accommodation seat in the cutting direction so as to match different shapes and diameters of the element S of the structure to be cut. Associated with the anchorage cradle 7 is a means 8 for tightening the element S of the structure against it. Said means can girdle the element S of the structure on the side away from the cradle 7 and in the illustrated embodiment it is formed by a metallic cable which is passed at least twice around the portion of the element S that is away from the anchoring cradle 7 and at planes which are spaced apart and parallel to the cutting plane, preferably coincident with the respective sides of the framework, in this instance with the upper side and lower side thereof. The free ends of the cable are fixedly connected to the opposite peripheral edges of the stationary transverse member 3 at points 10 thereon which are aligned to each other perpendicularly with respect to the cutting plane and which are arranged intermediately between one of the guides 2 and the corresponding side of the anchorage cradle 7, while it is turned round to points 10' which are symmetrically opposite with respect to the central axis which is directed in the cutting direction, between the opposite guide 2' and the facing side of the anchorage cradle 7. The connection of the ends of the cable is effected with the intermediary of adjustable tension means 9 such as, for example, turnbuckles or the like.

Movably mounted on the slide guides 2, 2' is a cutting unit which is formed by two slides 11, 11' each comprising two tubular slide members 12 which are engaged on the respective guide tubes 102, 102' and are connected rigidly to each other. The sliding movement of the slide members 12 is ensured thanks to an inner lining of suitable material such as, for example, teflon or the like. Each slide 11, 11' carries a turn-round pulley 13, 13' which is rotatable about an axis perpendicular to the cutting plane and having mounted thereon an endless cutting cable 14, for example, of the diamond-coated beads type and capable contemporarily both of cutting metallic materials and other materials such as cement, concrete, stone, or the like. Advantageously, the turn-round pulleys 13, 13' are arranged in an outwardly-protruding position, both laterally and vertically beyond the corresponding sides of the slides 11, 11'. This permits to cut easily flush with the supporting bottom, for example, a vertical pillar such as that shown in the drawings with no need, unlike what has been effected heretofore, to dig a trench around the base of the pillar to permit the personnel to work.

Specifically, the two turn-round pulleys 13, 13' are mounted on shelves 111, 111' of the slides 11, 11', protruding outwards from the outer sides thereof. One of the two turn-round pulleys 13' is mounted stationarily and is associated with an actuating motor M. The other turn-round pulley 13 is mounted so as to be displaceable crosswise to the cutting direction towards and away from the powered pulley 13', so as to allow the cutting cable 14 to be mounted and made taut, said pulley 13 being associated with removable means 113 to lock it in position. Preferably, the displaceable turn-round pulley 13 has also associated therewith means for its predetermined positioning in an approaching position and in one or more tensioning positions of the cutting cable 14. In this example, the turn-round pulley 13 is rotatably mounted on a supporting plate 213. The plate 213 is secured to the shelf 111 by means of through-bolts 113 engaged in slots 211 in the shelf 111. Moreover, the plate 213 and shelf 111 have respective rows of at least two holes 311, 312 therethrough in registry with each other and receiving a removable locking pin 15. This permits carrying out with great rapidity the operations of mounting and tensioning the cutting cable 14.

On the head member outer side facing towards the structural element S to be cut, each slide 11 is connected to a traction cable 16. The traction cable 16 extends exteriorly along the respective guides 2, 2' and is turned round parallelly to the rear side of the stationary transverse member 3 by means of an idle turn-round pulley 17 which is rotatably mounted about an axis perpendicular to the cutting plane on a rear bracket 103 of the transverse member 3. Provided intermediately of the rear side of the transverse member 3 is a further shelf 203 mounting two additional turn-round pulleys 18 for directing the respective traction cable 16 in a vertical direction upwards. The turn-round pulleys 18 are comparatively close to each other and, preferably, they are mounted on a common bracket 19 which can oscillate about a horizontal axis parallel to the transverse member 3. The vertically turned round and near branches of the traction cable 16 are connected at their ends to a variable-buoyancy body 20, such as an inflatable balloon. By varying the amount of air or gas fed into the balloon, the buoyancy push thereon can be varied, thus obtaining the possibility of adjusting very simply the thrust of the cutting cable 14 against the element S to be cut in accordance with the power of the cutting unit and the type of materials constituting the structure. In addition, the arrangement of the vertically turn-round pulleys 18 on a common oscillatable bracket 19 permits the execution of cuts along planes of any inclination with respect to the horizontal plane, including the vertical direction.

The application of the device to a structural element S to be cut is extremely rapid and simple. The cutting frame is straddled on the element S to be cut by removing the transverse removable member 4 and the cutting cable 14. After effecting the anchorage in the cradle 7 by the tightening means 8, the cutting cable 14 and removable transverse member 4 are mounted. Finally, the pre-established required amount of air or gas is fed into the balloon 20. From the above, it becomes apparent that said operations can be carried out easily and quickly by a reduced number of workers. At this stage, the underwater local operations have been completed, and the cutting stage may be controlled safely and with great ease from the surface. The only actuating motor to be fed adequately is, in effect, the one which is associated with the powered turn-round pulley 13' and is suitably connected to the control and feed means A at the surface.

In the illustrated example, the pillars of the structure are formed by concentric steel tubes which are separated by an interspace which is filled with either cement or concrete. Upon activation of the device, the cable 14 of diamond-coated beads is displaced transversely against the pillar S with a constant and suitably calibrated force and it cuts indifferently and with no problems both the metallic and the concrete portions without requiring any interruptions for using either manually or automatically other types of tools.

Of course, the invention is not limited to the embodiments just described and shown, but broad changes and modifications, especially of constructional nature, may be made thereto without departing from the basic principle disclosed above and claimed below.

I claim:

1. A cutting device for cutting underwater structures comprising:
   an underwater cutting frame including releasable means for providing anchorage of the device to the structure to be cut and for positioning the device with respect to a predetermined cutting plane;
   a powered cutting unit, including a cutting tool and a variable buoyancy means for displacing the cutting tool in a cutting direction parallel to the cutting plane of said cutting frame, so as to move the cutting tool from an initial position of non-interference with the structure to be cut to a final position wherein said cutting tool has moved through the structure by passing therethrough along the predetermined cutting plane, said cutting tool comprising a cutting cable;
   an underwater adjustable unit, supported by the underwater cutting frame, for displacing said cutting unit in the cutting direction; and
   an above water remote actuation and control means for controlling operation of the cutting unit.

2. A device according to claim 1, wherein said cutting cable includes diamond-coated beads.

3. A device according to claim 1, wherein the cutting frame comprises an interior and the cutting frame comprises an anchorage cradle which is open towards the interior of the cutting frame and having associated therewith removable means for locking the structure against the anchorage cradle; a pair of slide guides provided with limit stops at their ends, said guides being directed in the cutting direction, parallel to each other and parallel to the cutting plane, being spaced from each other transversely to the cutting direction, and being disposed on opposite sides of the anchorage cradle, and wherein each of said guides slidably carries a slide for a respective turn-round pulley, each said turn-round pulley being rotatable about an axis perpendicular to the cutting plane and extending substantially on said cutting plane, and at least one of said turn-round pulleys being powered, the cutting cable being of an endless configuration, and being mounted on said turn-round pulleys.

4. A device according to claim 3 wherein the powered turn-round pulley for the cutting cable is stationarily fixed on the associated slide and is actuated by a motor also carried by the slide, and the other turn-round pulley is mounted on the other slide so as to be freely rotatable and displaceable from a nearer position nearer to the powered turn-round pulley to a father position farther therefrom wherein the cutting cable is tensioned, removable means being provided to lock the displaceable turn-round pulley in position.

5. A device according to claim 4 wherein the displaceable turn-round pulley includes positioning means for pre-established positioning of the displaceable pulley so as to enable the displaceable pulley to be locked temporarily in the nearer position and in the farther position.

6. A device according to claim 5, wherein the displaceable pulley is mounted on a plate which is so restrained as to be slidable transversely to the cutting direction and lockable in position on a shelf which is affixed to the slide, and wherein the positioning means comprises registering rows of holes in the slidable plate and in the shelf and a removable locking pin insertable into said holes.

7. A device according to claim 3 wherein the turn-round pulleys protrude laterally outwardly from the cutting frame so that the cutting plane extends beyond mutually facing parallel sides of the cutting frame.

8. A device according to claim 3, further comprising an above water traction unit comprising said variable-buoyancy means which is connected by cables to said slides, said cables being disposed exterior to the cutting frame, and said cables including first end portions which are connected to the slides and which extend parallel to the guides and further end portions which are connected to the hollow body, said cables being diverted by means of diverting turn-round pulleys towards each other so as to be disposed on opposite sides of a central point with respect to the guides and extending in parallel in a vertical upward direction, the diverting pulleys being mounted on a common bracket which is secured exteriorly to the cutting frame so as to be pivotable through an angle of at least 90° about a horizontal axis and in a central position between the two guides, so that the cutting frame can assume any inclined position between a horizontal and a vertical orientation of the cutting plane.

9. A device according to claim 8 wherein said variable buoyancy means comprises an inflatable balloon.

10. A device according to claim 3, wherein the anchorage cradle is secured to a first transverse side of the frame that is disposed transverse to the cutting direction and opposite to a second transverse side of the frame parallel to said first transverse side, said second transverse side comprising an openable member, said cradle being formed with a recess which tapers in the cutting direction, said device further comprising a tightening device including at least one cable for engaging the structure on the side thereof away from the anchorage cradle.

11. A device according to claim 10, wherein the at least one cable includes a portion which extends exteriorly to sides of the cutting frame that are parallel to the cutting plane and said at least one cable being removably secured at one end thereof to a side of the frame to which the anchorage cradle is secured, at intermediate points between the anchorage cradle and the respective guide, said points being located symmetrically with respect to a central longitudinal axis of said cutting frame, said device further including tensioning means for tensioning said at least one cable.

12. A device according to claim 3, wherein sides of the cutting frame orientated in the cutting direction are constituted by said guides, and sides of the cutting frame that extend transverse to the cutting direction comprise a first transverse side comprising a openable member and an opposite transverse side to which the anchorage cradle is secured.

13. A device according to claim 1, wherein the cutting frame comprises a rectangular framework and an anchorage cradle is arranged interiorly thereof, in a region at a first end of a pair of parallel sides of the framework, centrally therebetween, said sides each including a second end and said cradle being open towards the second ends of said sides, said sides being connected to each other by a removable transverse member so that the cutting frame can be opened to provide straddling of the structure to be cut.

14. A device according to claim 13 wherein said removable transverse member includes hinge means for enabling removal thereof, said hinge means including hinges having an extractable hinge spindle.

* * * * *